(12) United States Patent
Kaufmann et al.

(10) Patent No.: US 7,885,730 B2
(45) Date of Patent: Feb. 8, 2011

(54) SYSTEMS, METHODS AND COMPUTER PROGRAM PRODUCTS FOR LANE CHANGE DETECTION AND HANDLING OF LANE KEEPING TORQUE

(75) Inventors: Timothy W. Kaufmann, Frankenmuth, MI (US); Farhad Bolourchi, Novi, MI (US)

(73) Assignee: Nexteer (Beijing) Technology Co., Ltd.

( * ) Notice: Subject to any disclaimer, the term of this patent is extended or adjusted under 35 U.S.C. 154(b) by 353 days.

(21) Appl. No.: 11/972,230

(22) Filed: Jan. 10, 2008

(65) Prior Publication Data

US 2008/0183342 A1 Jul. 31, 2008

Related U.S. Application Data

(60) Provisional application No. 60/897,596, filed on Jan. 26, 2007.

(51) Int. Cl.
*G05D 1/00* (2006.01)
(52) U.S. Cl. .............................. 701/1; 701/41; 340/436; 340/425.5; 340/937
(58) Field of Classification Search ...................... 701/1, 701/36, 41, 301; 340/435, 436, 437, 425.5, 340/463, 937, 938, 575; 180/446
See application file for complete search history.

(56) References Cited

U.S. PATENT DOCUMENTS 7,266,436 B2    9/2007   Shirato et al.
2003/0097206 A1* 5/2003  Matsumoto et al. ............ 701/1
2005/0125125 A1  6/2005  Matsumoto et al.
2006/0069481 A1* 3/2006  Kubota et al. ................. 701/41
2007/0091173 A1  4/2007  Kade et al.
2008/0136612 A1* 6/2008  Machii et al. ............... 340/435

FOREIGN PATENT DOCUMENTS

| DE | 10114470 A1 | 9/2002 |
|---|---|---|
| EP | 0640903 A1 | 8/1994 |
| EP | 0806336 A2 | 11/1997 |
| EP | 1867542 A1 | 12/2007 |
| JP | 200340132 A | 2/2003 |
| WO | 2005063546 A1 | 7/2005 |

OTHER PUBLICATIONS

Communication from European Patent Office dated Jun. 8, 2010 for EP1950115.
International Search Report dated Oct. 29, 2009 for EP1950115.

* cited by examiner

*Primary Examiner*—Gertrude Arthur Jeanglaud
(74) *Attorney, Agent, or Firm*—Cantor Colburn LLP

(57) ABSTRACT

Systems, methods and computer program products for lane change detection and handling of lane keeping torque during an un-signaled lane change. Disclosed herein is an exemplary embodiment for a method including calculating a distance between a center of a vehicle and a center of a lane, determining a discontinuity in the calculation of the distance between the center of the vehicle and the center of a lane and disabling torque corrections to compensate for the discontinuity until the vehicle is near the center (position based) of the new lane and a certain time has elapsed (time based) from the detection of the discontinuity. Hysterisis or smoothly changing torque controls are offered to work with the Time and Position based lane change handling method.

12 Claims, 8 Drawing Sheets

SYSTEMS, METHODS AND COMPUTER PROGRAM PRODUCTS FOR LANE CHANGE DETECTION AND HANDLING OF LANE KEEPING TORQUE

Priority based on U.S. Provisional Patent Application, Ser. No. 60/897,596, filed Jan. 26, 2007, and entitled, "Lane Change Detection and handling of Lane Keeping Torque", is claimed.

FIELD OF THE INVENTION

This invention relates to a lane change detection system, and more particularly, to systems, methods, and computer program products for lane change detection and handling of lane keeping torque.

BACKGROUND

In using camera to detect the relative position of a vehicle in a lane, an issue arises when one is changing lanes without any use of the turn indicators. A lane keeping system that does not detect or react to lane changes can provide an undesirable torque feedback during such a lane change. The behavior of the camera during a lane change is now described. As the vehicle drifts out of a lane, the distance calculated for the center of the vehicle to the center of the lane becomes larger. The lane keeping system could provide a torque to the steering system proportional to the distance. As the vehicle continues to drift, at some point the camera starts to pick up the new lane markers and transitions to the new lane markers. When this event happens (i.e. drift to left), the former left marker now becomes a right marker measurement. Thus, there is a discontinuity in the calculation of where vehicle is with respect to the lane center when the camera switches to the new lane markers. This discontinuity can cause an abrupt pull in effect toward the center of the next lane which can be undesirable.

SUMMARY

Disclosed herein is an exemplary embodiment for a method including calculating a distance between a center of a vehicle and a center of a lane, determining a discontinuity in the calculation of the distance between the center of the vehicle and the center of a lane and enabling a torque correction to compensate for the discontinuity.

In another exemplary embodiment disclosed herein is a method, including disengaging a lane keeping torque in response to detecting a lane change, calculating a time period and re-engaging a lane keeping torque in response to the expiration of the time period.

In another exemplary embodiment disclosed herein is a method, including disengaging a lane keeping torque in response to a detection of a lane change, determining a position of a vehicle with respect to a center of a lane and re-engaging the lane keeping torque in response to a pre-determined distance of the vehicle to the center of the lane.

In another exemplary embodiment disclosed herein is a method, including providing a hysterisis to a lane keeping algorithm, the hysterisis providing a correction to a lane keeping torque to eliminate the lane keeping torque during a lane change.

In another exemplary embodiment disclosed herein is a method, including disengaging a lane keeping torque in response to a detection of a lane change, determining a position of a vehicle with respect to a center of a lane, calculating a time period, and re-engaging a lane keeping torque in response to at least one of the vehicle moving within a predetermined distance of the vehicle to the center of the lane and the expiration of the time period.

In another exemplary embodiment disclosed herein is a method for lane change detection and handling of lane keeping torque, the method including detecting a movement of a vehicle from a first lane to a second lane, increasing a first torque to the vehicle to retain the vehicle in the first lane, detecting further movement of the vehicle from the first lane to the second lane, in response to detecting the further movement of the vehicle from the first lane to the second lane, decreasing the first torque to the vehicle and applying a second torque to the vehicle to retain the vehicle in the second lane.

The above-described and other features will be appreciated and understood by those skilled in the art from the following detailed description, drawings, and appended claims.

BRIEF DESCRIPTION OF THE DRAWINGS

Refer now to the figures, which are meant to be exemplary, not limiting, and wherein the like elements are numbered alike.

DETAILED DESCRIPTION

In exemplary embodiments, a lane change can be detected by detecting the discontinuity on the calculation for the center of the vehicle to the center of the lane. In an exemplary implementation, a sign change with large magnitude signals can be detected. In another exemplary implementation, the absolute value of the difference between the previous measurement and the current measurement can be compared to a maximum value that should not be exceeded unless there is a lane change condition. When the value is detected, the lane keeping system shuts off the torque immediately and remains off for a calibratable delay time, such as two seconds. Then the system can wait until the vehicle is less than a value closer to the center in the next lane, e.g. 0.3 meters, before re-enabling the torque correction. In another exemplary implementation, a delay can be used in lieu of waiting for the vehicle to be near the center of the next lane. In general, being near the center causes the least torque to be generated by the lane keeping system, while the delay assures that the vehicle has reached a steady state condition. A software algorithm, which achieves a detection/shut-off combination, can be implemented by a state machine or a triggered sub-system.

The present invention may be utilized in various types of vehicles employing electronic steering or steer by wire systems or with the addition of an electric motor on a hydraulic steering system, or electric controllable hydraulic system. In an exemplary embodiment, the systems and methods can be applied to an automobile employing an electric power steering system. While an exemplary embodiment is shown and described by illustration and reference to an automobile steering system, it is appreciated by those skilled in the art that the invention is not limited to the automobiles alone or may be applied to all vehicles employing electronic steering systems, steer by wire systems, or even hydraulically controlled steering systems or electric controlled hydraulically controlled steering systems where a lane keeping command may be integrated with existing steering commands.

Figure 1:
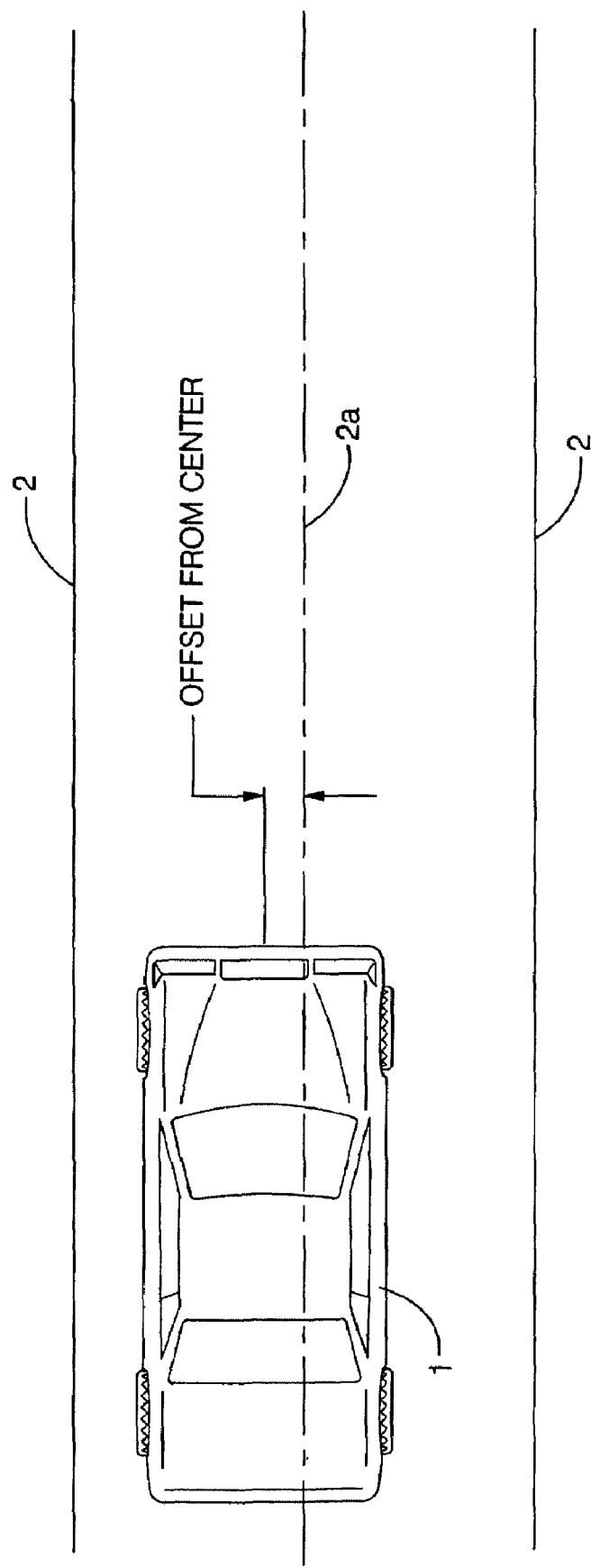
FIG. 1 illustrates a diagram of a vehicle in a lane with markers.

Referring now to FIG. 1, there is depicted a vehicle 1 in a lane with various lane markers 2 to the left and right 2, and calculated center of lane 2a. The lane keeping systems and methods described herein can provide two modes of operation, a helper or assist mode, and an autonomous mode. In helper mode the operator is hands on, and the system provides audio warning(s) and/or tactic feedback warnings (for example, to simulate the noise/feel of a rumble strip or torque nudges) that indicates the vehicle is approaching a lane marker. The warnings and cues may be overridden by activation of a turn signal indicating operator intent to change lanes. For example, in the helper (assist) mode, because application of torque nudges can cause the vehicle 1 to dart back and forth between lane markers 2 if the driver were not controlling the steering wheel, it desirable to determine if the drivers is, in fact holding the wheel. If so, then a torque nudge may be applied. As disclosed at a later point herein, a pressure/force sensor may be employed to determine if the driver is controlling the steering wheel. (or other methods such as the hysteresis embodiment that makes it irrelevant whether the driver has his hands on the wheel or not).

Figure 2:
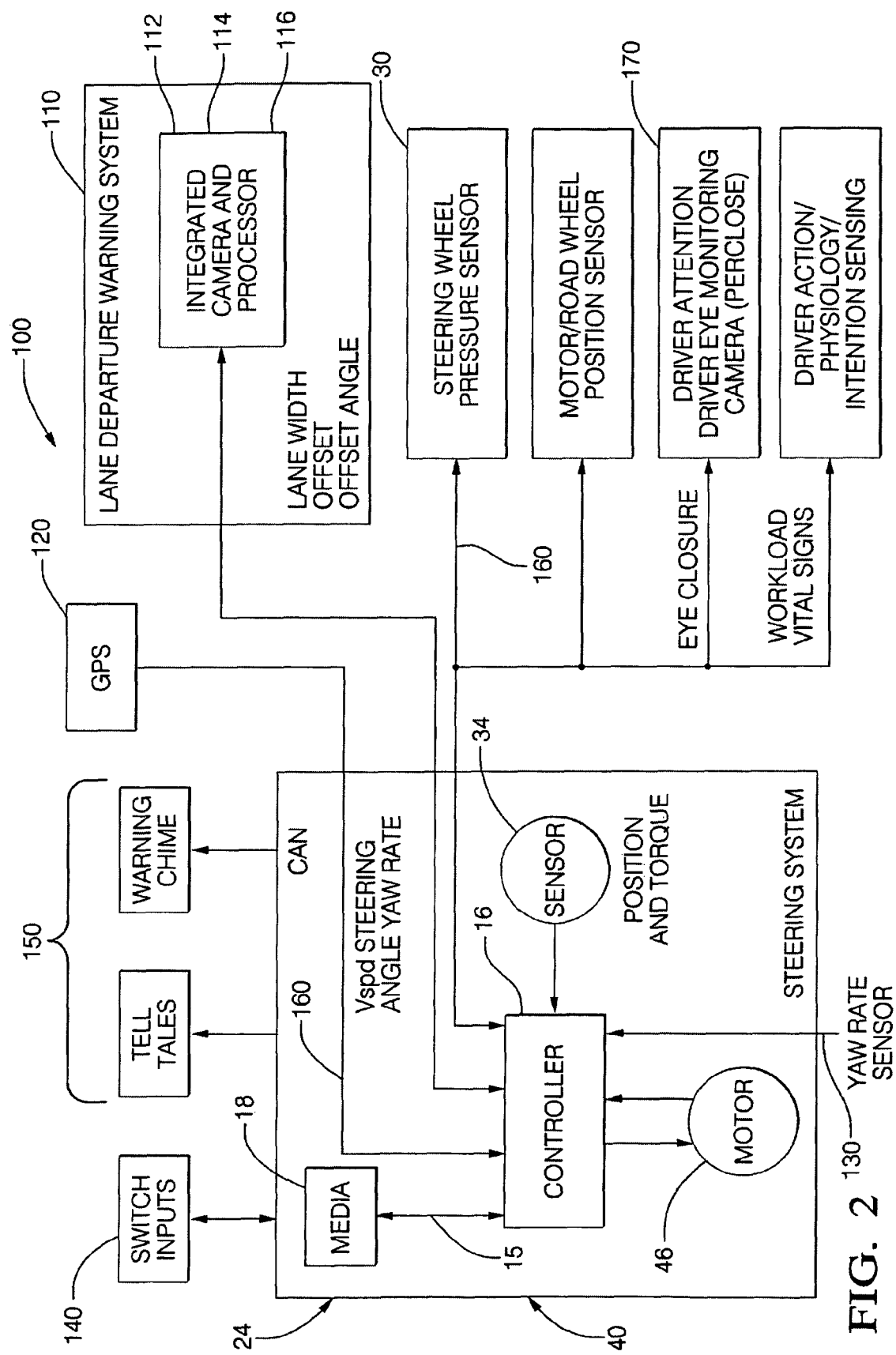
FIG. 2 illustrates a block diagram of a lane keeping system in accordance with an exemplary embodiment.

Referring to FIG. 2, there is shown a simplified block diagram of a lane keeping system 100 in accordance with an exemplary embodiment. A lane departure warning system 110 including a lane tracking system 112 is integrated with an electric steering system 40. The lane tracking system 112 may include but not be limited to, a camera system for detection of lane markers/markings and computing a lane position signal 114. The lane keeping system 100 is also optionally integrated with auxiliary sensors such as a global positioning system (GPS with map navigation system) 120 and dynamic sensors 130 such as, but not limited to a yaw rate sensor. The lane keeping system 100 is also integrated with various controls 140 and enunciators 150 to provide indications and feedback to the operator.

The integration of GPS may be employed for route planning and navigation. Furthermore, GPS may be employed to inform the lane keeping system 100 when the vehicle 1 is approaching a defined point in the roadway, such as, an exit, but not limited thereto. Under such conditions, the lane keeping system 100 can identify the type of lane marker 2, e.g., dashed or solid. If, for example, the right line is solid, it may be inferred that the vehicle 1 is in the right most lane. The lane keeping system 100 would switch to the left line if the route planning indicates that the intention is to continue along the present course. This switch ensures that the lane keeping system 100 does not direct the vehicle 1 down the exit. If, on the other hand, it is intended to take the exit, the lane keeping system 100 would be in the right lane (if it is a right exit) and track the right most lane marker 2, to direct the vehicle 1 on to the exit.

In an exemplary embodiment, the lane keeping system also includes a driver attention-monitoring device 170. The driver attention-monitoring device 170 facilitates the lane keeping system 100 taking action when the operator's attention is not focused on the roadway. The driver attention-monitoring device 170 informs the lane keeping system 100 that the driver is at some level of drowsiness/inattentiveness. The driver attention monitoring device 170 includes, but is not limited to a camera system with infrared flood (or equivalent apparatus) to monitor the status of the operator, in particular, an operator's eyes. In one exemplary embodiment the driver attention monitoring device 170 monitors the operator's eye (s) to ascertain a percentage eye closure. The lane keeping system 100 may then employ such a determination by taking action and providing warnings to the operator. For example, the driver attention-monitoring device 170 may be employed as an indicator when the driver has taken their eyes off the roadway for a duration exceeding a selected time.

When the driver attention-monitoring device 170 ascertains that a driver is inattentive, the lane keeping system 100 can respond with torque nudges, if the driver's hands are on the steering wheel 26 (helper (Assist) mode). In addition, audible (raising and lowering of the radio may be part of this feature) and visual warnings may be activated along with steering wheel buzz (as described herein). If the driver does not take control of the vehicle 1 or the driver attention-monitoring device 170 does not indicate that the driver is awake, the lane keeping system may enter autonomous mode. The system may communicate to other systems in the vehicle 1 that the driver is not responding. The lane keeping system 100 may be integrated with other systems such as speed control and steering to slow the vehicle 1, or pull off to the side of the road and stop. Moreover in vehicles 1 equipped with OnStar® type capability, the OnStar® system may be activated. Advantageously, such systems may be highly beneficial for cases of medical or law enforcement emergencies, etc.

In Autonomous mode (if selected by the driver) the system is enabled after the operator has maintained the vehicle 1 within a tolerance band from the lane center for a selected period. The lane keeping system warns the operator of an impending engagement of the autonomous mode with a chime, and then engages. The autonomous mode maintains the vehicle 1 in the lane and requires no operator input to control the vehicle 1. In an exemplary embodiment, the lane keeping system employs a left marker as the primary marker but can readily transition to the right marker if the left marker cannot be identified. In the autonomous mode, the torque sensor is used for determining driver intent. In this mode, the driver may want to make a correction and/or override the lane keeping system 100. So, when the driver inputs a torque greater than about 3.5 Nm for EPS, 1.5 Nm Hydraulic system (which can depend on the base power assist tuning), the lane keeping system 100 transitions to the helper (assist) mode. When the driver has completed his correction the lane keeping system 100 transitions back to autonomous mode when the driver is within 0.5 meters of the lane center, for five second duration, when both of these conditions have been met the lane keeping system transitions back to the autonomous mode.

Referring still to FIGS. 1 and 2, the lane keeping systems and methods described herein can be configured to operate with center deviation functionality. The lane keeping system responds when the vehicle 1 deviates from the center of the lane by a selected offset. When the vehicle 1 deviates, the system activates a visual warning lamp, audible warnings, and provides a torque nudge to the operator via the steering wheel in the direction away from the lane boundary line.

In an exemplary embodiment, the lane keeping system is enabled for a selected speed range of the vehicle 1. The system may be configured to operate only over a small range of total system authority and rates. In an exemplary embodiment, the lane keeping system utilizes ten percent of total system control authority on the output side. The control authority shall not exceed the driver's maximum torque value (generally less then 6 Nm). It will be appreciated that other configurations are conceivable. It is further appreciated that the methods and systems for lane change detection and handling of lane keeping torque described herein generally are implemented during an un-signaled lane change.

Figure 3:
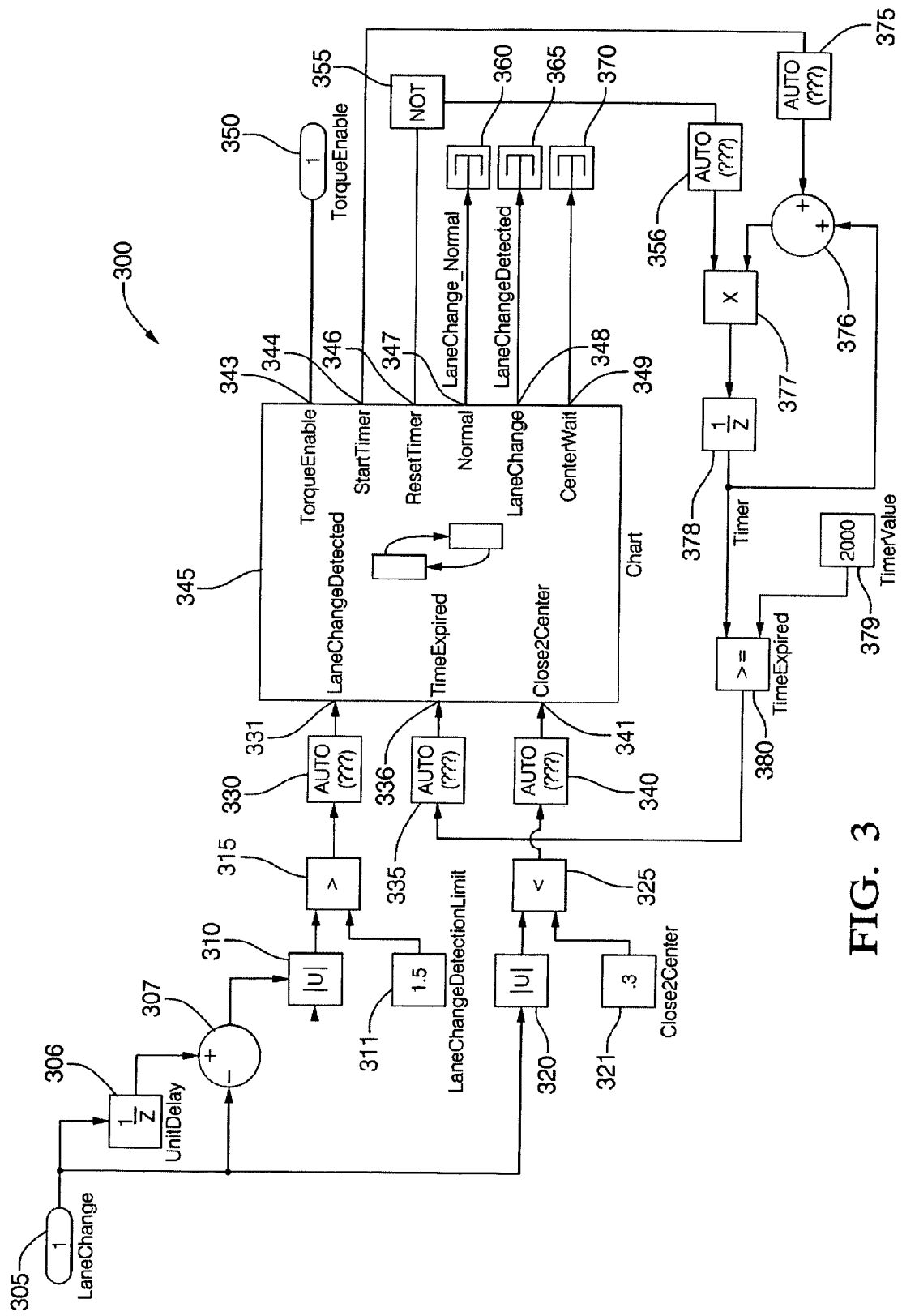
FIG. 3 illustrates an embodiment of a state chart/block diagram implementation of a lane change detection and handling of lane keeping system based on time and distance.

FIG. 3 illustrates an embodiment of a state chart implementation of a lane change detection and handling of lane keeping system based on time and distance. Camera data is collected at node 305 (which is the distance of the vehicle center line to the lane center). In order to manage torque, the data collected at node 305 is processed accordingly. The data is processed with a delay at node 306. The difference between the delayed data and the data as collected at node 305 is taken at node 307, and the absolute value of that difference is determined at node 310. The absolute value determined at node 310 is compared with a lane change detection limit 311 to determine if the absolute value has exceeded this limit at node 315. In general, nodes 330, 335, 340, 375, 356 perform a data type conversion and implementation detail for transferring data from one number system to another. When the data value has exceeded the predetermined limit, a lane change is indicated. This logic output is input into a state chart 345 at 331 indicating that a lane change has or has not occurred. The state chart is discussed in greater detail with respect to FIG. 4 below.

Similarly, the absolute value of the data collected at node 305 is determined at node 320 and compared to a close to center number at node 321. The absolute value determined at node 325 is compared to the close to center number to determine if is less than the predetermined number, indicating that the vehicle has closed within a pre-determined distance from the center of the lane. This logic output is input into the state chart 345 at 341 indicating that the vehicle is or is not close to the center of the lane.

The state chart 345 has several outputs that are now discussed. Logic output TorqueEnable 343 determined whether or not torque is generated at output 350. A StartTimer output 344 determines whether or not a timer that can be set during the implementation of a lane change. A ResetTimer logic output 346 is used to reset the timer, if necessary. The ResetTimer output 346 is input into a logic-not node 355. In general, the timer is used to ensure that the vehicle is in the center of the lane and has had the time to settle down before re-enabling the lane keeping torque. A preset timer determined by the reset timer output 346 multiplied with the StartTimer output 344 at node 377 and subject to a delay 378 is looped and output to a comparison node 380. A preset timer value 2000 (corresponds to 2 seconds) indicative a normal time for a lane change is compared to this preset tinier data. The logic output of node 380 is input at 336 on state chart 345. Otherwise, logic state data is output from state chart 345. The logic output includes normal lane change data 347 that is input at node 360; lane change detected data 348 that is input at node 365; and center wait data 349 that is output to node 370.

Figure 4:
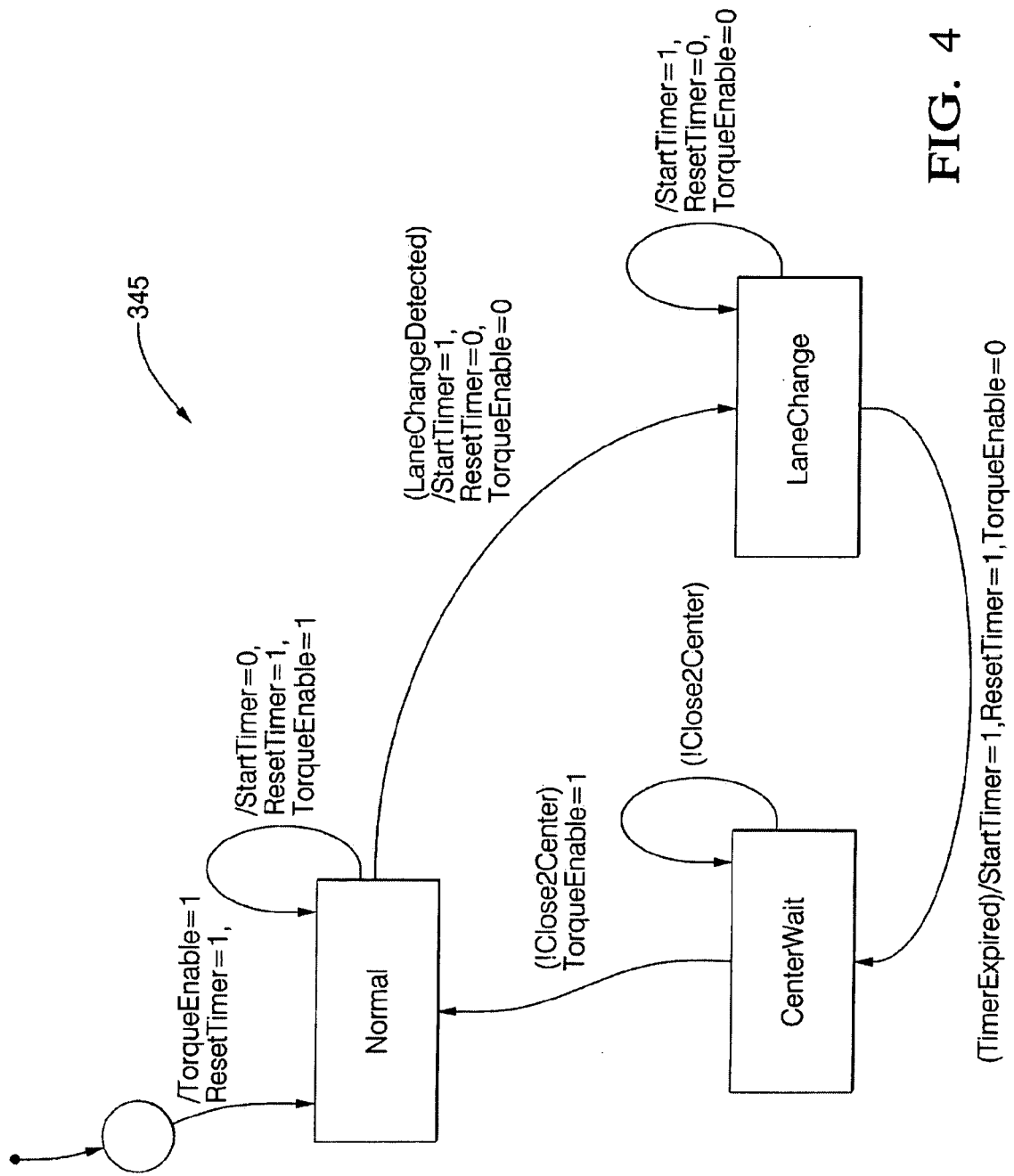
FIG. 4 illustrates an embodiment of a state chart/block diagram of a implementation of a lane change detection and handling of lane keeping system based on time and distance, as implemented in the state chart implementation of FIG. 3.

FIG. 4 illustrates an embodiment of a state chart of an implementation of a lane change detection and handling of lane keeping system based on time and distance, as implemented in the state chart implementation of FIG. 3. The state chart 345 illustrates the several logic states as discussed above for the different lane change states that can occur. For a normal lane change, the start timer logic is 0, indicating that the timer is not to be started. The ResetTimer logic is set to 1 indicating that the timer is reset and TorqueEnable is also set to 1 indicating that normal lane keeping torque is enabled. When a lane change is detected, the StartTimer logic is set to one to enable the timer as discussed above. The ResetTimer is set to 0 and TorqueEnable is set to 0 indicating that lane keeping torque is disabled to allow a normal lane change. These logic states are maintained to determine if a normal lane change is occurring as discussed above. If the Timer has expired, the StartTimer logic is set to 0 indicating that the timer is no longer necessary, the TimerReset is set to 1 to reset the timer and TorqueEnable remains set at 0 indicating that lane keeping torque is disabled. For the CenterWait state, TorqueEnable is set to 1 to allow lane keeping torque to be applied if it has been determined that the vehicle is close to center.

Figure 5:
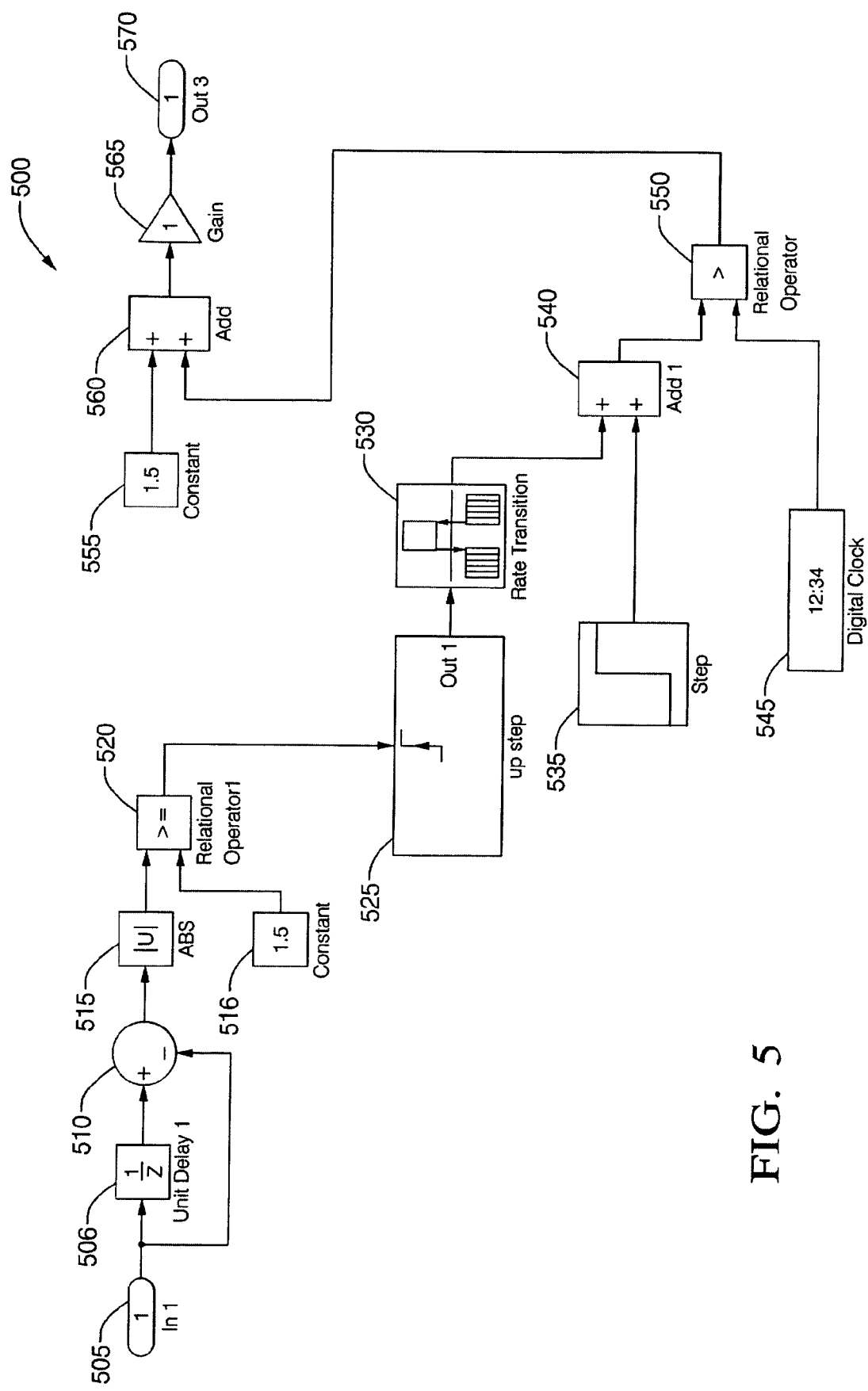
FIG. 5 illustrates an embodiment of a time-based implementation of a lane change detection and handling of lane keeping system.

FIG. 5 illustrates another embodiment of a time-based block diagram implementation of a lane change detection and handling of lane keeping system. Camera data is collected at node 505 (which is the distance of the vehicle center line to the lane center). The camera data indicates that a lane change is or is not occurring. The difference between the data subject to a delay at node 506 and the data with no delay is taken at node 510 and the absolute value of that difference is determined at node 515. The absolute value determined at node 515 is compared with a constant 516. If the absolute value is equal to or greater than the constant 516 (e.g. 3 meters), then a timer is triggered at node 525, which outputs data into a rate transition node 530. Node 525 creates a positive step signal once triggered by a lane change indication as determined by node 520. The transition node 530 ensures smooth data exchange. The output of the rate transition is added with an adjustable duration 535 at node 540, the output of which is compared at relational operator node 550. The output of additional node 540 is compared to a clock 545 output. The logical output of the relational operator node 550 is added to a constant 555 at node 560. The output of node 560 is subject to an adjustable gain node 565 and output at node 570. In general, the timer continues to be enabled until a selectable (thru parameters of Node 535) length of time of the lane change has elapsed. The time-based lane based detection 500, is triggered with a lane change and sends a pulse output that stays valid until a selectable time (i.e. 2 seconds) has elapsed. The output 570 is used to stop the application of any helper mode torque.

Figure 6:
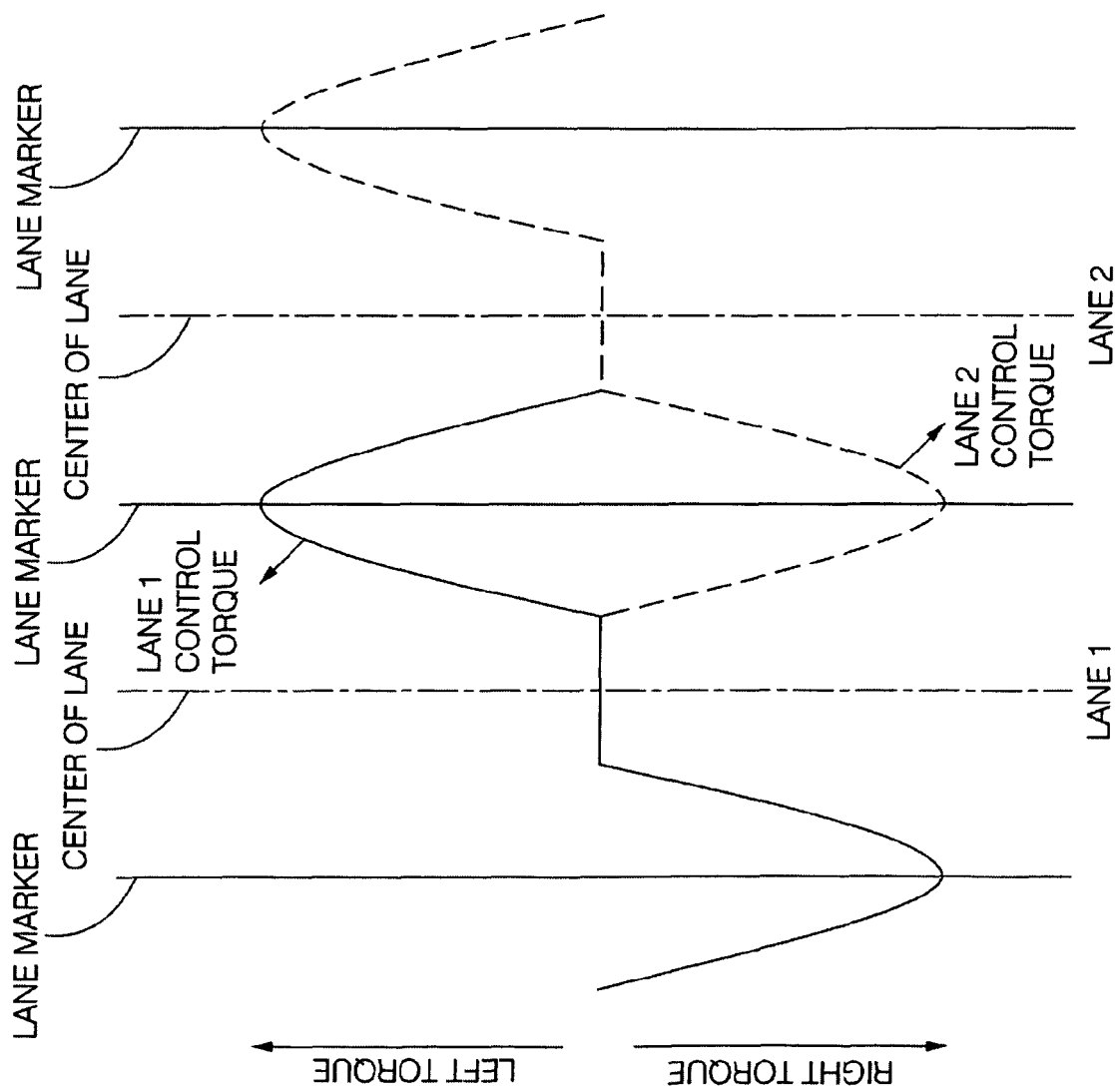
FIG. 6 illustrates an the activation of the lane keeping system based on distance in accordance with exemplary embodiments.

FIG. 6 illustrates an embodiment of the activation of the lane keeping system and handling of lane keeping torque based on distance. In general, FIG. 6 illustrates that the systems and methods described herein follow one smoothly changing torque, either the left or right torque, until the vehicle is in a new lane. As the vehicle drifts from lane 1 the torque pushing it back to the center of lane 1 is first increased, and then it decreased when the vehicle crosses the lane marking. The torques are switched from lane 1 control torque to lane 2 control torque, when values are equal. The smoothly changing torque control is offered as an alternative to work with the Time and Position based lane change handling method. The combined solution can be more robust to variety of situations.

Figure 7:
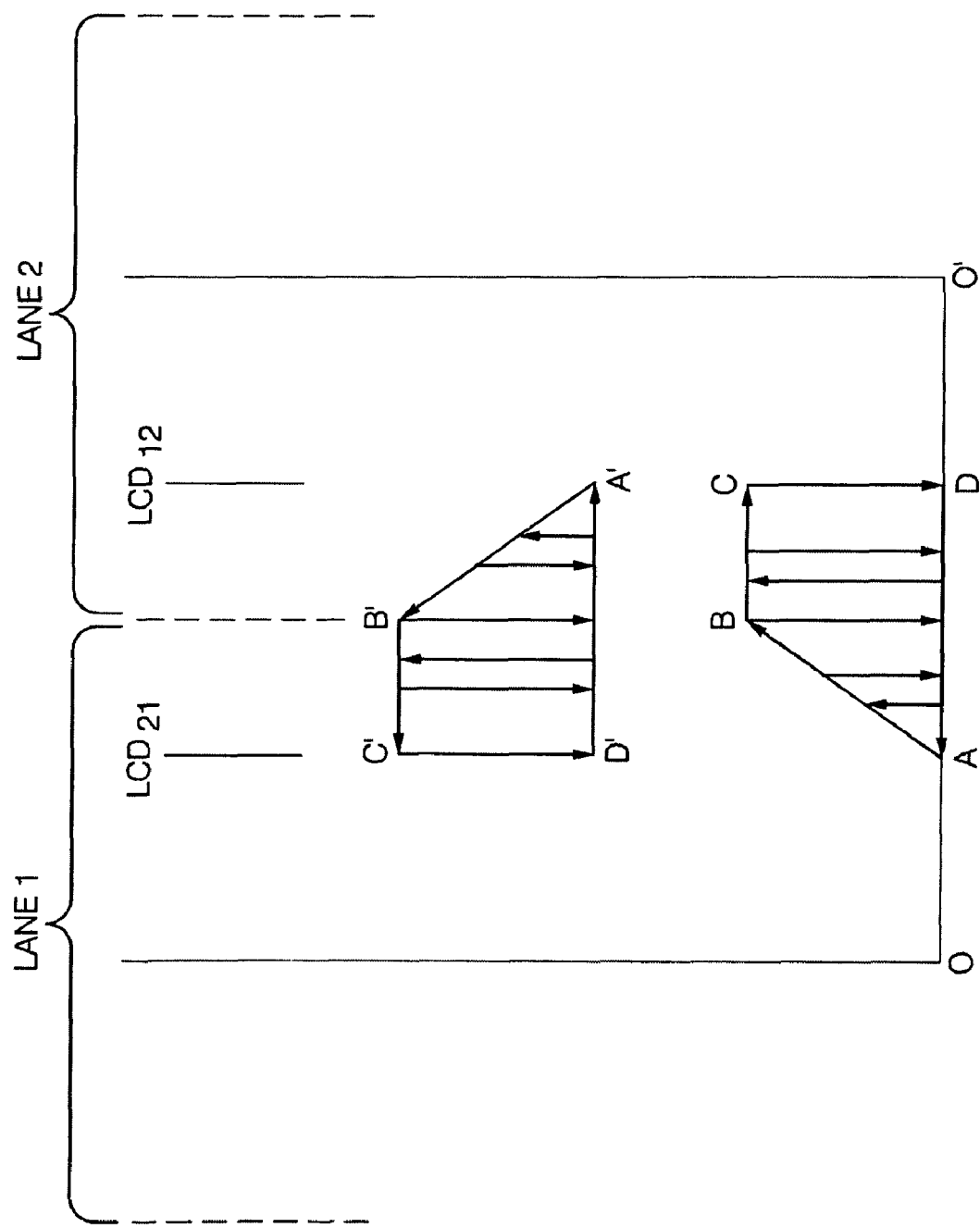
FIG. 7 illustrates an alternative activation of the lane keeping system using distance with hysteresis in accordance with exemplary embodiments.

FIG. 7 illustrates an embodiment of a an alternative activation of the lane keeping system using distance with hysteresis, lane change detection and handling of lane keeping system. FIG. 7 illustrates the use of hysteresis in a lane keeping application in accordance with exemplary embodiments. In general, if a vehicle is at center point O of lane 1 and starts to drift toward lane 2, as it does so, the systems remain inactive until the vehicle drifts to point A in so far as its lateral coordinate is concerned. The hysteresis loop ABCDA is then activated. As the vehicle drifts further (the AB phase), a command is generated to return the vehicle back toward the center of the road. The output (command) can be linearly related to the input (the amount of deviation beyond point A) as shown, or there may be a nonlinear relationship in this phase. In general, monotonically increasing relationships are contemplated in the example. It is appreciated that in other embodiments and implementations, other relationships are contemplated.

As the vehicle drifts further to the right (i.e. phase BC which is beyond the right lane markings of lane 1), the command continues to push the vehicle back toward the center of lane 1. It is understood that in phase BC a slight increase of the output is possible. However, for simplicity, a saturation of output is shown here. If the vehicle starts to return toward the center of lane 1 during AB or BC, the output drops to zero. This result occurs because while it is important and acceptable to driver's to be warned/resisted if they are drifting away from the center of a lane, it is undesirable for them to be assisted toward the center once the vehicle is on its way back. Once on the return path (DA), if the driver pushes the car back toward lane 2 he is resisted again with a command pushing the car toward the center of lane 1. These effects are denoted by the upward arrows in the hysteresis loop ABCDA in FIG. 7. It may be beneficial to smooth out this transition further. That is, a transition to engage an active command may need to be smoother than the transition to disengage one, or visa versa.

If, on the other hand, the vehicle drifts further into the lane 2, the output goes to zero. At this point (i.e. D), a lane change that actually has taken place is flagged, otherwise the lane keeping does not do anything if the vehicle moves further to the right. The lane change (from lane 1 to lane 2) detection is denoted in FIG. 7, as $LCD_{12}$. Once it is detected that the vehicle is in lane 2, the control switches to the A'B'C'D'A' hysteresis loop. Thus, if the vehicle moves from A' toward the Center, O', nothing happens as if the vehicle is still being controlled from lane 1. The control while in lane 2 is identical to that of the first lane. The change indicator if the vehicle drifts away from lane 2 and into lane 1 is referred to as $LCD_{21}$. This lane change detection allows the system to revert the control back to lane 1.

In a case that a wrong lane is selected, the hysteresis action ensures that the conflict is between +command and 0, as oppose to between +/−commands. For example, if the vehicle is in the AB segment and is moving to the right, the command wants to bring the vehicle to the left. If the lane 2 control is (incorrectly) activated, the vehicle is assumed to be in the B'C' segment. However, since the vehicle is drifting to the right, lane 2 controls generate a zero command (i.e. corresponding to D'A' segment). Without the hysteresis effect, the lane 2 command would have wanted to push the vehicle to the right, in contradiction to the lane 1 control. Secondly, points A' and D are shown to be at the same location (Likewise, points D' and A). This common location enforces that as the vehicle comes close to the center beyond some point, there is no command regardless of the vehicle being under the control of one lane or the neighboring lane. In addition, $LCD_{12}$ and $LCD_{21}$ may be collocated at the lane marking. This collocation could be done either by removing the saturation region (CB & B'C') or starting the hysteresis loops closer to the center (point A &A').

Figure 8:
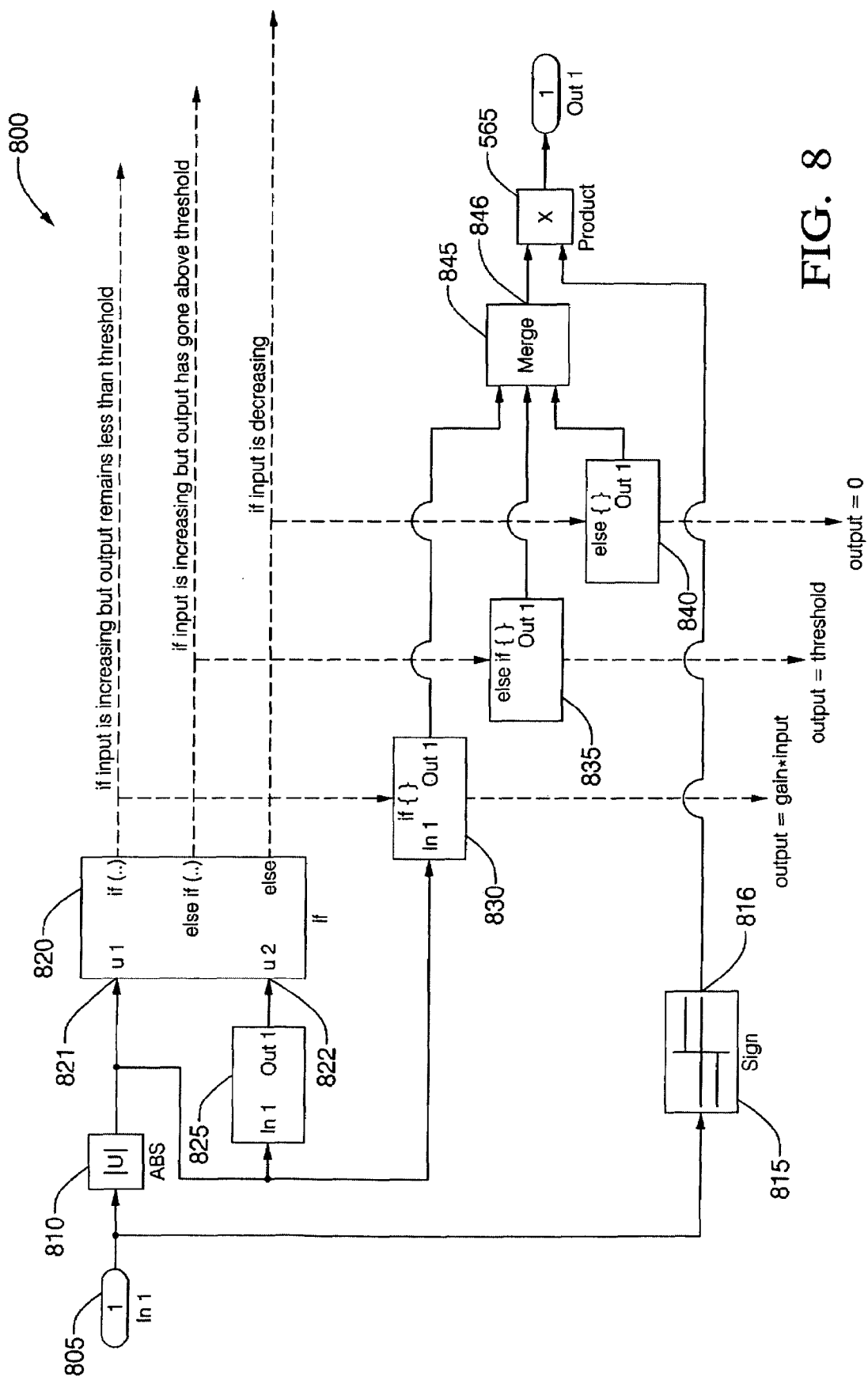
FIG. 8 illustrates a block diagram of an embodiment of a lane change detection and handling of lane keeping system based on distance implementing a hysteresis control loop as discussed in FIG. 7.

FIG. 8 illustrates a block diagram of an embodiment of a lane change detection and handling of lane keeping system based on distance and hysteresis control as discussed in FIG. 7. Camera data containing the position of the vehicle with respect to lane center is collected at node 805. The 'Absolute Value' function node 810 is used in conjunction with the 'Sign' function node to simplify the main 'If' block 820 complexity. The first input 821 to the 'If' block is the input (i.e. when the side of the car is at point A the input value is zero, and when the side of the car is at the lane marking the input at its maximum) and the second input 822 to it is a filtered derivative of the first input. The second 822 input determines whether the input is increasing or decreasing, or in other words, if the vehicle is moving to the right or to the left. A digital filter 825 is used to reduce the noise of a pure derivative. In exemplary embodiments, the cut off frequency of the filter 825 is calibratable. It is understood by those skilled in the art that there could be alternative filters, which would yield similar functionality. The three path outcome of the 'If' block are that: a) the input is increasing and the output is less than a threshold, for which the output is a gain * the input (see FIG. 7 segment AB) at node 830; b) the input is increasing and the output is more than a threshold, for which the output is saturated at the threshold value (see FIG. 7 segment BC) at node 835; or the input is decreasing, for which the output will be zero (see FIG. 7 segment DA) at node 840. The three outputs are combined together with a 'Merge' block 845. Output 846 of the 'Merge' block 845 is multiplied at the multiply node 850 with the output 816 of the sign node 815.

The hysterisis torque control is offered as an alternative to work with the time and position based lane change handling method. The combined solution can be more robust to variety of situations.

The disclosed systems and methods can be embodied in the form of computer or controller implemented processes and apparatuses for practicing those processes. It can also be embodied in the form of computer program code containing instructions embodied in tangible media, such as floppy diskettes. CD-ROMs, hard drives, or any other computer-readable storage medium, wherein, when the computer program code is loaded into and executed by a computer or controller, the computer becomes an apparatus for practicing the method. The method may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the method. When implemented on a general-purpose microprocessor, the computer program code segments configure the microprocessor to create specific logic circuits.

It will be appreciated that the use of first and second or other similar nomenclature for denoting similar items is not intended to specify or imply any particular order unless otherwise stated. It is further appreciated that references to left and right as well as number used for logic can be interchanged and used otherwise in other implementations.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A method for lane change detection and handling of lane keeping torque, the method comprising:
   detecting a driver input torque exceeding a threshold value;
   disengaging a lane keeping torque in response to said driver input torque exceeding said threshold value;
   detecting said driver input torque decreasing below a threshold value;
   calculating a time period; and
   re-engaging a lane keeping torque in response to an expiration of the time period.

2. A method for lane change detection and handling of lane keeping torque, the method comprising:
   detecting a driver input torque exceeding a threshold value;
   disengaging a lane keeping torque in response to said driver input torque exceeding said threshold value;
   detecting said driver input torque decreasing below a threshold value;
   determining a position of a vehicle with respect to a center of a lane; and
   re-engaging the lane keeping torque in response to a pre-determined distance of the vehicle to the center of the lane.

3. The method as claimed in claim 2 further comprising measuring a distance from the center of the lane.

4. The method as claimed in claim 3 further comprising detecting a sign change if the distance from the center of the lane has exceeded a pre-determined magnitude.

5. The method as claimed in claim 2 further comprising:
   measuring a first distance from the center of the lane at a first time; and
   measuring a second distance from the center of the lane at a second time.

6. The method as claimed in claim 5 further comprising comparing an absolute value of a difference between the first and second distance.

7. A method for lane change detection and handling of lane keeping torque, the method comprising:
   detecting a driver input torque exceeding a threshold value;
   disengaging a lane keeping torque in response to said driver input torque exceeding said threshold value;
   detecting said driver input torque decreasing below a threshold value;
   determining a position of a vehicle with respect to a center of a lane;
   calculating a time period; and
   re-engaging a lane keeping torque in response to the vehicle moving within a pre-determined distance of the vehicle to the center of the lane or an expiration of the time period.

8. The method as claimed in claim 7 further comprising measuring a distance from the center of the lane.

9. The method as claimed in claim 8 further comprising detecting a sign change if the distance from the center of the lane has exceeded a pre-determined magnitude.

10. The method as claimed in claim 7 further comprising:
    measuring a first distance from the center of the lane at a first time; and
    measuring a second distance from the center of the lane at a second time.

11. The method as claimed in claim 10 further comprising comparing an absolute value of a difference between the first and second distance.

12. A method for lane change detection and handling of lane keeping torque, the method comprising:
    detecting a movement of a vehicle from a first lane to a second lane;
    increasing a first torque to the vehicle to retain the vehicle in the first lane;
    detecting further movement of the vehicle from the first lane to the second lane;
    in response to detecting the further movement of the vehicle from the first lane to the second lane, decreasing the first torque to the vehicle; and
    applying a second torque to the vehicle to retain the vehicle in the second lane.

* * * * *